United States Patent [19]

Schomer

[11] 4,429,711
[45] Feb. 7, 1984

[54] MULTIVALVE MANIFOLD INTERLOCK AND CONTROL SYSTEM

[75] Inventor: Marion L. Schomer, Houston, Tex.

[73] Assignee: Anderson Greenwood & Co., Bellaire, Tex.

[21] Appl. No.: 355,476

[22] Filed: Mar. 8, 1982

[51] Int. Cl.³ .................................... F16K 35/14
[52] U.S. Cl. .......................... 137/385; 70/DIG. 70; 137/637.1; 251/90; 251/288
[58] Field of Search ............... 70/265, DIG. 70; 137/637.1, 383, 385; 251/90, 89, 288

[56] References Cited

U.S. PATENT DOCUMENTS

| | | | |
|---|---|---|---|
| 599,283 | 2/1898 | De Freitas | 137/637.1 |
| 1,309,295 | 7/1919 | Magee | 137/637.1 |
| 1,898,569 | 2/1933 | Pearson | 137/637.1 |
| 2,011,824 | 8/1935 | Pearson | 137/637.1 |
| 2,371,727 | 3/1945 | Andrews | 137/637.1 |
| 2,692,617 | 10/1954 | Jensen | 137/637.1 |
| 2,884,008 | 4/1959 | Elsdon | 137/637.1 |
| 3,448,961 | 6/1969 | Enssle | 251/288 |

FOREIGN PATENT DOCUMENTS

| | | | |
|---|---|---|---|
| 288731 | 11/1915 | Fed. Rep. of Germany | 137/637.1 |
| 357841 | 1/1906 | France | 137/637.1 |
| 815370 | 1/1959 | United Kingdom | 137/637.1 |

Primary Examiner—George L. Walton

[57] ABSTRACT

In the preferred and illustrated embodiment, a multivalve manifold control and interlock system is set forth. The multivalve manifold comprises three valves arranged within a valve body, wherein valve stems with optional handles are located above the valve body to be gripped and rotated. The valve body encloses three ball or plug valves. They are switched by 90° rotation. Each stem supports a circular disk, and the three stems are equipped with three circular disks which interlock. Certain arcuate notches are cut in the circular disks. The arrangement of the notches limits the sequence in which the valves are opened and closed. Moreover, opening and closing is constrained to the sequence required for safe operation of the multivalve manifold. Further, a lock bar is incorporated, and is profiled to fit with the valve stems for locking.

16 Claims, 16 Drawing Figures

MULTIVALVE MANIFOLD INTERLOCK AND CONTROL SYSTEM

BACKGROUND OF THE DISCLOSURE

This disclosure is an interlock system directed to a multivalve manifold connecting process pressures to an instrument. A multivalve manifold is defined as three valves, typically plug or ball valves, located in common manifold body. Such multivalve manifolds are ordinarily used with differential pressure measuring instruments on pipelines. For instance, a pipeline might incorporate an orifice plate forming a restrictive pressure drop in the pipeline. Flow rate through the pipeline is derived from a measure of the pressure drop across the orifice plate. To this end, a multivalve manifold must be connected across the orifice and also to the measuring instrument. The differential pressure measuring device normally requires several interconnected valves. This apparatus discloses a multivalve manifold suitable for differential pressure type flow measuring instruments on a pipeline. It provides the valving necessary to connect a differential pressure transducer across the orifice. A first valve communicates with the high pressure side of the orifice and is connected to the high pressure side of the differential pressure transducer. A second valve provides a connection from the low pressure side of the orifice plate. A third valve connects across the transducer by connections within the manifold body between the two lines in the body. Two lines in the body are normally required to complete the necessary connections between the pipeline and the differential pressure transducer. The third valve and associated line is perpendicular to the pressure sensing lines of the body. The third valve is ordinarily included to facilitate testing, equalizing or other procedures. The third valve is opened to calibrate the differential pressure measuring instrument as an example.

The incorporation of three valves within a manifold presents three valve stems and suitable handles on stems for operation. There is a customary or desirable normal operating mode for the three valves. In the normal mode, the first and second valves are normally open while the third valve is closed. For nomenclature purposes, the first valve is the valve that connects the low side of the orifice plate to the low side of the pressure transducer. The second valve is the high side connection. As will be appreciated, the low and high side valves and their connecting lines are typically identical to one another. Confusion of the two is regrettably all too easy and improper operation often results.

In the normal operating mode, it is desirable to isolate the pressures on the two sides of the sensor or transducer. The third valve connects the two pressure lines for calibration, testing and service work on the transducer. The present apparatus is particularly adapted to interlock the valve stems to limit the sequence in which the valves can be opened and closed. It permits opening and closing in a prescribed sequence whereby the three valves are operated safely. Safety interlock systems between the three valves presently comprise suitable labels on the valves indicative of the open and closed positions. Labels will not prevent improper operation. Such labels are typically installed with the valves. The labels are successful assuming that the service personnel knows and understands precisely how the valves function and the sequence in which they must be operated. While this is desired of all service personnel, it nevertheless is not a fact. The prior art further discloses valve handle or stem protective systems including arrangements whereby the handles, stems, or both are selectively removed so that special tools (an Allen wrench as an example) are required to even operate. This interferes with ready access to the valve equipment. Moreover, it does require the use of specialty tools, and is thereby deficient in this regard.

Features of this apparatus include an interlock system whereby the three stems are interlocked with one another. They are all interlocked using circular disks of a specified diameter. The disks are selectively notched. The notches which are formed in the various disks are cut at a diameter to enable one disk to rotate while the other two disks remain locked relative to one another, being engaged at the periphery with the respective notches. The disks interlock so that only one valve can be opened. After that one valve has been opened by rotation through 90°, a notch on the disk of that valve stem is then rotated to enable the second disk and the second valve associated with it to rotate. When the second valve is operated, the disk which it supports is then rotated to position a notch on the second disk to enable the last valve to be operated. The three disks, in blank form, are identical for ease of manufacture. In fact, stamping and notching procedures are easily implemented as desired. Alternate manufacturing steps can be selected. They are preferably installed on a manifold having three valve stems arranged in a symetrical relationship. Specified sequences of opening and closing are thereby permitted.

This apparatus further includes a lock bar. The stems are preferably constructed of nonround stock. Ideally, hex stock is used although rectangular stock can be used. Whatever the case, the nonround stock of the stems serves as a keyed member. A lock bar is devised which is easily secured between two stems and extends past the valve body to enable a lock and chain to fasten it. When the operative condition of the manifold is altered, the lock bar is first removed, the valves are then operated, and the lock bar is thereafter reinstalled. The lock bar is keyed so that it is merely reinstalled on two stems with the same face exposed. The lock bar includes a pair of openings, keyed for fitting over a pair of valve stems such that it can be installed on both the stems to secure the stems in the two states permitted. The two states of the valves are locked by simply placing the lock bar over the stems in the only available mode of installation. If the bar fits the keyed stems, the stems are correctly rotated. If the bar will not fit, a valve has been improperly operated. This also enables the operator to know at a glance the operative condition of the multivalve manifold by virtue of color or symbol coding on the discs and exposed instrument body face. They are best color coded or otherwise painted with symbols (observed along with the lock bar) indicating the open and closed condition of the multivalve manifold.

One embodiment involves a lock bar with spaced openings keyed to fit over stems made of non-round stock. Another embodiment of the locking mechanism includes round stems drilled with holes at a common elevation. On rotation, they are aligned to enable a bicycle lock to pass through two aligned openings and fasten the stems in position. Once the stems are locked, rotation is prevented.

BRIEF SUMMARY OF THE DISCLOSURE

This disclosure sets forth a multivalve manifold interlock system. It cooperates with valve stems of three ball or plug valves arranged within a valve body. The interlock system, in the preferred embodiment, comprises identical circular disks which are notched in a preferred manner. They have a diameter such that, when mounted at a common elevation on each stem, the disks interfere with one another and forbid rotation. The disks are selectively notched, the notches conforming to the diameter of the disk blanks. The notches are so located that the three disks interlock. After installation, only one valve can be operated first and the others are operated only after the first. The operation of the first, the only one permitted, then permits opening of the second which then permits changing of the third. Operation of the multivalve manifold is achieved in controlled sequence, and the sequence is also reversed in restoring the multivalve manifold to its original state.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrated only typical embodiments of the invention and are not to be considered limiting of its scope, for the invention may admit to other equally effective embodiments.

DETAILED DESCRIPTION OF THE PREFERRED EMBODIMENT

Figure 1:
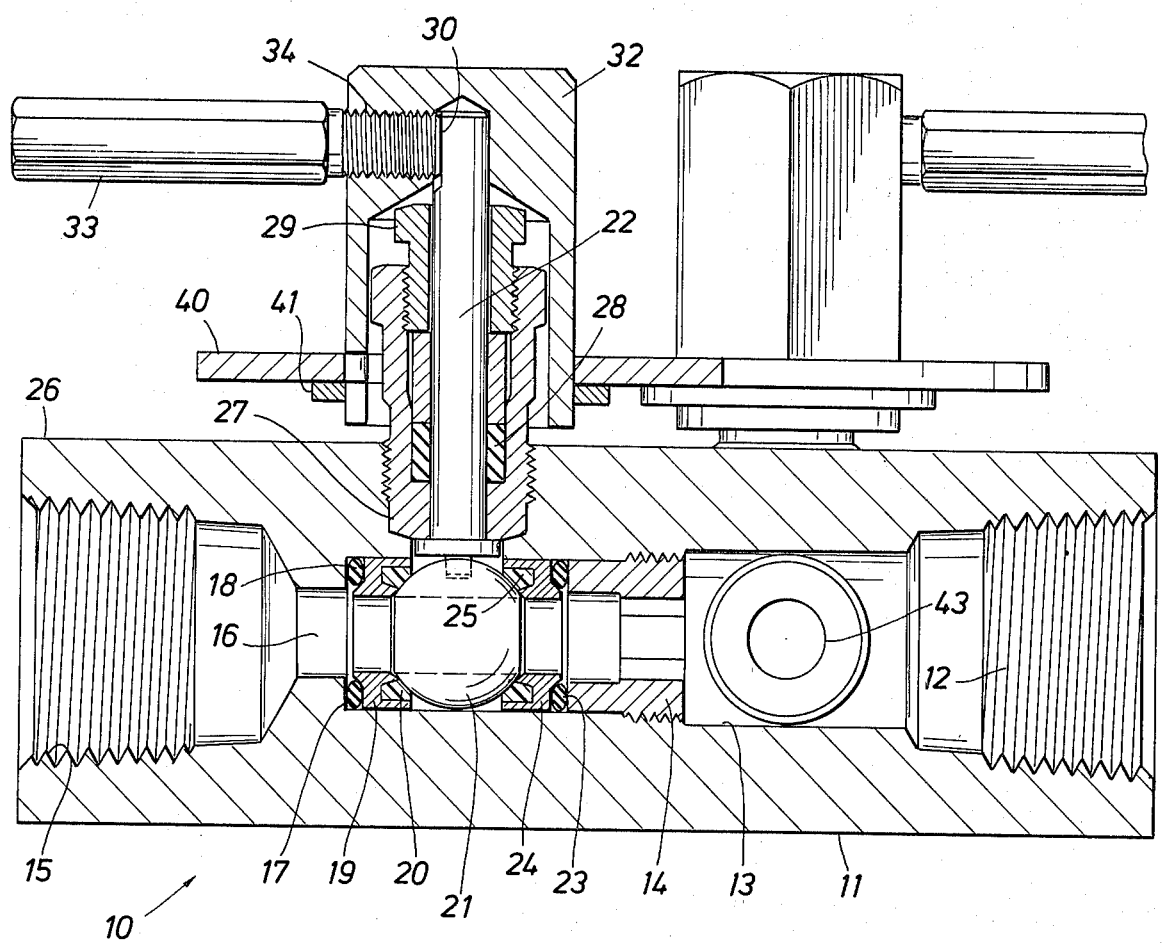
FIG. 1 is a sectional view through a multivalve manifold disclosing a ball valve supporting a stem and handle wherein the stem is equipped with the interlock disk of the present disclosure.

Attention is first directed to FIG. 1 of the drawings. In FIG. 1, the multivalve manifold of the present disclosure is identified by the numeral 10. The apparatus of this disclosure includes the interlock system. A description of the apparatus will begin by setting forth the mode of construction and operation of the valves within the manifold body. After they have been described, a typical set of connections will be given. Thereafter, the interlock system will be described so that the manner of interlocking is understood in the context of the valves which are protected by the interlock system.

The manifold is best used for connecting a measuring instrument to a pair of pipeline orifice taps. The preferred use involves connection of a pair of lines to a differential pressure instrument. The lines transfer pressure; fluid flow is practically nil in operation. In fact, fluid flow normally does not occur except to fill the lines at the time of installation. The present invention is, therefore, a device useful in communicating fluid pressure; fluid flow is incidental to the system.

A valve body 11 of generally rectangular shape is shown in FIG. 1. A tapped opening 12 defines an outlet port. The port 12 opens into an outlet passage 13. The passage 13 is countersunk to receive a retainer thimble 14. The retainer thimble 14 has an axial passage profiled to receive an Allen wrench. The passage is not circular. It matches a particular Allen wrench size to enable the threaded thimble 14 to be installed. The threaded thimble 14 is incorporated to secure all the valve apparatus within the passage 13. Accordingly, the thimble 14 can be unthreaded and the valve apparatus can thereafter be removed to service the valve element, valve seats and other components.

On the opposite face of the valve body 11, an inlet port 15 is axially aligned with the port 12. It too is provided with threads on the interior. It terminates at an inlet passage 16, the passage 16 having a specified diameter. The passage 16 extends to a transverse shoulder 17. A seal ring 18 is positioned against the shoulder 17. It supports a circular seat assembly 19. The seat assembly 19 further supports a seat ring 20. The ring 20 is surrounded by the seat assembly 19. This positions the seat ring for conformance with the outer spherical surface of a ball valve element 21. The valve element 21 is drilled with a passage matching the passage 16 when it is rotated to that position. The axial passage through the valve element is slightly smaller than the valve seat ring 20. The valve seat ring 20 seats against the valve, and with the application of suitable force between the valve element 21 and the soft ring, sealing against leakage is achieved.

The valve element 21 is a sphere drilled along the diameter as shown in FIG. 1. It also includes, at a perpendicular angle, a blind hole which is keyed to receive a keyed member on a valve stem 22. The valve stem 22 fastens to the valve element in this keyed arrangement so that the two rotate together. The stem 22 thus rotates the valve element 21. More will be noted regarding the stem.

The drawings further disclose a similar valve seat arrangement. This is constructed by installing a seal ring 23 adjacent to the thimble 14. It is jammed against a valve seat ring 24. The ring 24 is identical to the ring 19. They differ only in their placement, the two facing one another. Moreover, a soft valve seat material 25 having a form identical to the soft seat 20 is also installed. The two rings thus face one another. One is on the upstream side of the valve element and the other is on the downstream side. They are both pressure actuated. To this end, the thimble 14 is tightened until sufficient force is applied axially to the components, and a sealing force is achieved at the sphere 21. It is achieved on both the upstream and downstream sides of the valve element.

FIG. 1 shows the apparatus in the open position. The inlet port is at the left and a fluid is permitted to flow through the valve element 21 to the outlet port. Closure is achieved by 90° rotation. Assembly is achieved through the outlet port 12 through the use of an Allen wrench to remove the thimble 14 and to otherwise remove the parts which are in the valve. The valve seats can be periodically checked and replaced as desired through this procedure.

The valve body 11 is a rectangular body. The passages just described extend from end to end. It also is constructed with an upper face 26. The face 26 is the top or exposed face which service personnel normally observe. A perpendicular passage is drilled to receive the stem 22. The stem 22 terminates at an enlarged shoulder at the bottom end. Moreover, the stem is locked in position by means of a hollow threaded sleeve 27. The sleeve 27 threads to the valve body 11 by means of suitable internal threads in the drilled hole to thereby position the stem. The sleeve 27 is held in position, and forces the stem downwardly into operative engagement with the valve element 21. The sleeve 27 extends above the top face 26. The sleeve is hollow to define an annular cavity around the stem 22. A seal ring 28 is positioned around the stem 22. The seal ring prevents leakage along the stem. Leakage on the exterior of the sleeve 27 is prevented by the threaded connection with the valve body 11. The seal ring supports the rotating stem. It will be recalled that the stem 22 is able to rotate through 90° to open or close the valve. The seal ring 28 is pressure actuated, the pressure being applied by a hollow seal compression nut 29 which is threaded around the stem 22. The compression nut 29 is loosely fitted around the stem. However, it threads to the sleeve 27 and creates sealing force acting on the seal ring 28.

The stem is constructed with a flat 30 at the upper end. The flat 30 is suitable for receiving a set screw or handle as desired. Moreover, the stem 22 extends into a stem cover 32. The stem cover 32 closes over and houses the sleeve 27, the nut 29, and the top end of the stem 22. The stem cover has a nonround external profile as will be described. A handle 33 is threaded into the stem cover 32 and abuts the flat face 30. This locks the handle to the stem and also prevents rotation of the stem cover 32 except with the stem 22. The handle 33 projects at a right angle to be grasped by hand and rotated. Alternatively, a set screw can be used to prevent hand operation, thereby enabling operation by use of a pipe wrench or the like.

The stem cover 32 is preferably made of hex stock. This is shown in FIGS. 2-6. The stem cover completely covers over the top of the stem and extends towards the top face 26. It is preferably counterbored to receive the operative equipment at an internal cavity whereby the stem and associated equipment is protected. This defines a surrounding skirt just above the top face 26. The surrounding skirt is selectively notched at locations having a specific azimuth relationship to the flat face 30 on the stem 22 and the tapped opening for receiving the handle 33. That tapped opening is identified by the numeral 34. This keys the equipment to be assembled in a consistent and specific azimuthal manner. Moreover, the skirt at the bottom of the stem cover 32 receives and supports a circular disk 40. The disk 40 is part of the interlock structure to be described. The disk is mounted on the stem cover 32 by sliding it over the end of the stem cover 32. A notch is cut from the bottom end of the stem cover 32 to serve as an alignment guide. In turn, the disk 40 has a protruding lobe which fits into the notch so that it can be assembled only at one azimuthal location. This prevents the disk 40 from rotating, or being assembled at the wrong relative angular position. The disk 40 is a circular disk (in blank form) which will be modified by notches on the periphery. This description, for the moment, assumes that the disk 40 is a blank. They are all identical in this regard, being formed of the same blanks. The disk 40 is held in position by a grip ring 41 which snugly fits against the bottom of the disk.

A particular dimension of the blank disk 40 should be noted. Considering a pair of adjacent valve stems in the multivalve manifold 10, the disk has a diameter larger than the distance between the center lines of adjacent valve stems. As an easy example, if two valves are arranged four inches apart, the disk 40 has a diameter of at least four inches, and the diameter is preferably about one-half to one inch larger. The diameter should not be so large that the notches, as will be described, cut more than about fifty percent of one radius into the disk.

Figure 2:
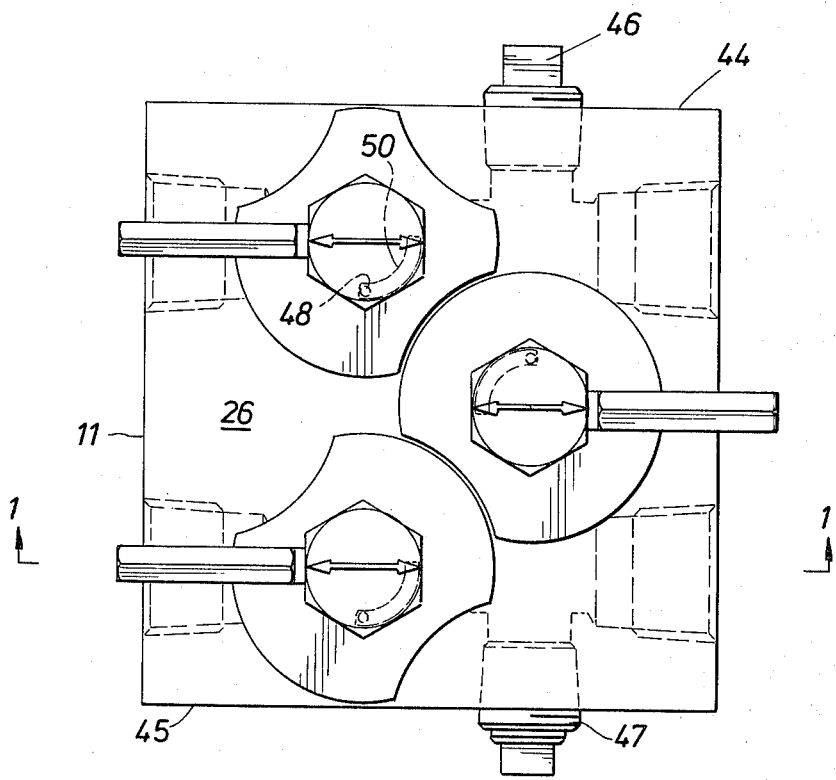
FIG. 2 is a plan view of a multivalve manifold having three stems with handles wherein the multivalve interlock disks are installed on the three stems and interlock with one another to limit rotation.

Speaking in general terms of the multivalve manifold, there are two parallel passages similar to that shown in sectional view of FIG. 1. The second is parallel to the first. The two parallel passages are cross-connected to accommodate the third valve. Recalling that the first and second valves are in the two parallel passages, the third valve is cross-connected between them. FIG. 1 discloses a transverse passage 43. This aligns with the third valve within the body 11. The location of this passage is more readily understood on viewing FIG. 2. For ease of manufacture, the passage 43 is drilled fully through the valve body as shown in FIG. 2. A side face 44 is parallel to and opposite a similar side face 45. The passage 43 extends between the two side faces 44 and 45. For ease of assembly, the passage is drilled fully through the body 11 and is plugged. A small plug 46 is shown on the face 44 to plug the passage. A larger plug 47 is received in a larger drilled hole at the opposite face 45. The plugs 46 and 47 are removable to enable connection to the plugged ports of equipment useful in calibrating the test instruments. Again, this end of the passage is made larger so that the third valve can be assembled with a thimble 14 identical to that shown in FIG. 1. To this end, the third valve is identical to the valve shown in sectional view in FIG. 1 and differs only in its location within the valve body 11.

As shown in FIG. 2, the inlet ports are on the left and the outlet ports are on the right. There are no dedicated ports for the third valve, the third valve being connected between the two outlet ports on the right hand side.

The three valves in the valve body are marked in FIG. 2 with arrows. These arrows indicate the alignment of the passage in the valve element 21 for each of the three. This indicates whether or not they are open or closed. The first and second valves of FIG. 2 are in the open position. This communicates the inlet on the left with the outlet on the right. This occurs at both locations. The third valve is depicted with the handle and arrow parallel to the other two. However, it is positioned in a passage at right angles, and the third valve is therefore closed.

The range of rotation is 90° for all three valves. An alignment pin has been omitted from FIG. 1 for sake of clarity. FIG. 2, however, discloses in dotted line an alignment pin 48. The alignment pin permits rotation of the stem through 90°. The alignment pin extends upwardly into the skirt area of the stem cover 32. The skirt is notched as shown by the dotted lines at 50 in FIG. 2. This notch defines a 90° arc rotation permitted to the valve stem cover 32. The pin 48 jams against either end of the notch to limit rotation. There is no benefit in rotating beyond 90° and accordingly, the notch has a 90° arc. The 90° arc is constructed by notching the skirt. Obviously, it can be formed in other ways to define limits for rotation of the stem. In like fashion, all three valves are provided with suitable pins limiting rotation to 90°. As will be understood, the pin is fastened to the top face 26 of the valve body 11 and protrudes into the path to limit rotation.

Speaking in very general terms, FIG. 2 discloses three interlocking disks 40. They are constructed from identical blanks. However, all three are different. All three are notched in like fashion. One disk is provided with a single notch. A second disk is provided with two notches. The two notches are arranged on opposite sides of the disk. So to speak, they are 180° for one another. The third disk is provided with three notches. The three notches are arranged at 90° intervals around the disk, and the fourth interval is left unmodified. In terms of manufacture, the three disks are conveniently made from a common blank, and all are provided with the first notch. One-third of the disk blanks are then provided with two notches (spaced 180° apart) and one-third of the disks are provided with three notches. This lends itself to easy manufacture. Strictly speaking, the three notches can be reduced to two notches and still interlock; by using three notches on one disc, two advantages are obtained. One advantage is visual. Visual inspection which discloses the discs placed in clockwise arrangement with a sequence of one, two and three notches is easily done to verify proper installation. In addition, in some instances, the two notches are in adjacent quadrants and in other instances, they are in opposite quadrants. The second advantage of the three notch arrangement is that the disc will accommodate all possible locations of the two notches. These advantages become apparent on installing the interlocking discs on the valve stems in a clockwise sequence from any of the three stems.

Figure 3:
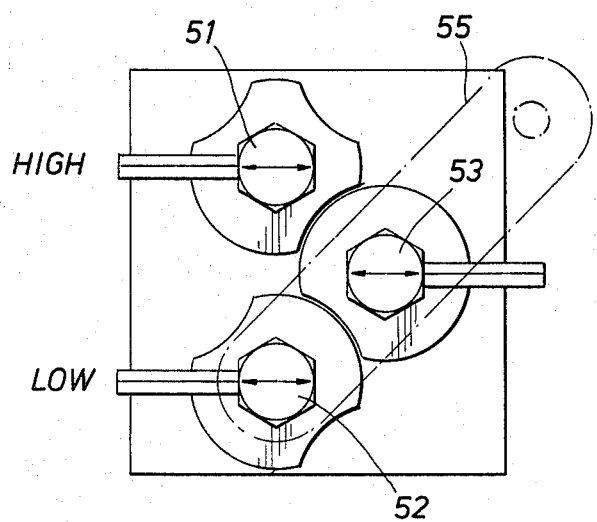
FIGS. 3-6 are similar plan views to FIG. 2 showing various operative positions of the interlock apparatus of this disclosure and also showing in dotted line in FIGS. 3 and 5 a lock bar placed on the valve stems to prevent tampering with their operative position.

The interplay between the disks to achieve interlocking is shown in FIGS. 3-6. FIGS. 3-6 are oriented in the same fashion as FIG. 2. That is, the inlet side for the manifold body is on the left and the outlet side is on the right. The topmost valve will be described as the first valve. In FIG. 3, this is the valve having the stem identified with the numeral 51. The bottom most valve in FIG. 3 is identified with the numeral 52 and this refers to the second valve. The third valve is identified by the numeral 53. They function in the manner previously described.

Figure 4:
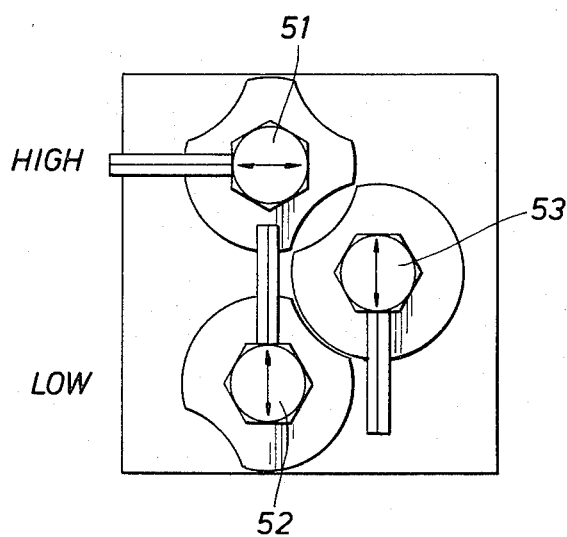
Figure 6:
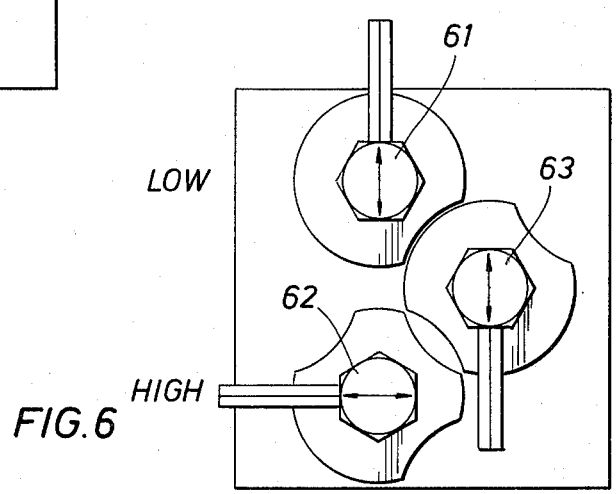

In FIG. 3, and ignoring for the moment the lock bar shown in dotted line, the first and second valves are open while the third valve is closed. This connects the two pressure lines from the pipeline on opposite sides of the orifice plate to the sensor. In this arrangement, assume that the first valve 51 is the high side of the two pressures for the transducer. To change or service the sensor, all three valves should be operated by quarter turn rotation (from the illustrated position) operating first the valve 52, secondly the valve 53 and the valve 51 last. Handle movement is in the clockwise direction as shown in FIG. 4. Viewing FIG. 3, it is not possible to operate the first valve 51. It is interlocked by the disk. It is not possible to operate the valve 53. It is also interlocked and rotation is forbidden. The only valve which can be rotated in FIG. 3 is the second valve 52. Accordingly, the second valve is rotated as the first step. The second valve 52 is rotated by turning it in a clockwise fashion as viewed in FIG. 3. This is shown in FIG. 4 where the valve 52 has been rotated. No other valve can be rotated until after the second valve 52 has been rotated. This is shown in the contrast between FIGS. 3 and 4. Going on to FIG. 4, the third valve 53 is also rotated as a second step in the sequence. It can be rotated only after the valve 52 has been rotated. The third valve, after rotation, positions its notch to free the first valve 51 for rotation. It has not been rotated in FIG. 4 but it is now free to be rotated. Accordingly, the three valves interlock with the disks of this apparatus to limit the sequence of rotation.

To restore the equipment to the original operative condition, refer now to FIG. 4. The first valve 51 is the only one that can be rotated to the altered position. This has been accomplished in FIG. 4 as that view is set forth. Moreover, the other two can only be operated in the reverse sequence. In summation, the sequence proceeding from FIG. 3 to FIG. 4 requires closure of the valve 52 first, closure of the valve 53 secondly and operation of the valve 51 last. In the reverse sequence, the valve 51 is operated first, the valve 53 secondly, and the valve 52 is last to be operated.

A simple summary of the sequence depicted in FIGS. 3 and 4 is that the valves are quarter turned clockwise and the sequence is to operate the only one permitted (the valve 52) and proceed as the interlocks permit.

Figure 7:
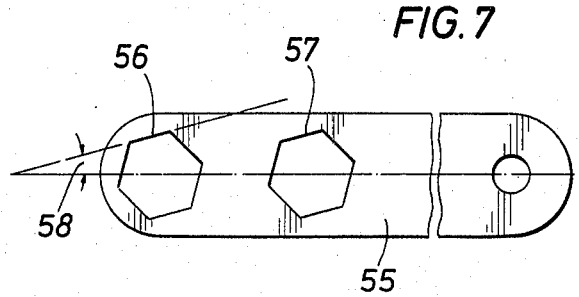
FIG. 7 is a plan view of the lock bar of the present disclosure.

Attention is momentarily directed to FIG. 7 of the drawings where a lock bar 55 is illustrated. It is constructed with keyed holes 56 and 57. The keyed holes 56 and 57 are spaced so that they are equal in distance from one another by the same distance between the valve stems 52 and 53 in FIG. 3. The stems are constructed with valve stem covers which are nonround, and which are keyed in profile. FIG. 7 depicts the nonround holes 56 and 57 in the lock bar keyed. Therefore, in addition to the spacing between the two, they are set at a specified angle. This angle is represented at 58. This angle is 15° is the preferred embodiment. The 15° angle obviously can be 75° as an alternative, this value being obtained by subtracting 15° from a right angle of 90°. They are identically positioned, that is both holes 56 and 57 are keyed at a 15° angle with respect to the center line. This would be true in the choice of hex stock for the hex sleeves and would also be true in the choice of rectangular stock also. The keying of the two holes 56 and 57 thus symbolizes to the operator (in the choice of hex stock material), that the two stems have both been rotated. For instance, it is not possible to operate only one of the two valves 52 and 53 and reinstall the lock bar. If one of the two is rotated through 90°, the hex openings will not both align at the 15° angle indicated. This has an advantage over rectangular stems.

The lock bar of FIG. 7 is first installed at the dotted line location in FIG. 3. It locks two of the valves in a particular position (note the arrows in FIG. 3) and can be demounted and reinstalled (after operation) on the valves 51 and 53 in FIG. 4. This is achieved by removing and reinstalling the lock bar. It is thus located at a symmetrical angle in FIG. 4. A color or symbol on the top face may be optionally incuded.

Figure 5:
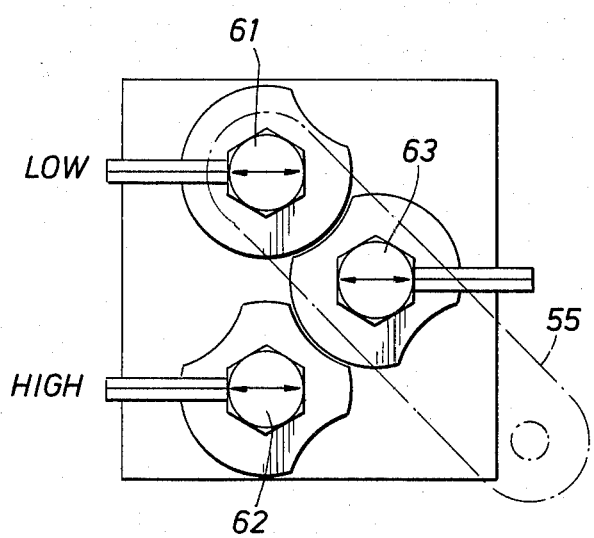

FIG. 5 should be contrasted with FIG. 3. Again, the inlets are on the left and the outlets are on the right. The three valve stems are in the same relative locations.

However, there is a difference. This difference is in the location of the three cams. Contrasting FIG. 3 with FIG. 5, the interlocking disks have been altered in location. The initial condition of the apparatus in FIG. 5 finds the first valve 61 open, the second valve 62 open, and the third valve 63 closed. Shifting now to FIG. 6, it will be observed that only the first valve 61 is permitted to operate whereupon it is closed. After it has been operated, the third valve 63 can be operated. The sequence proceeding from FIG. 5 to FIG. 6 again is restricted, namely only one valve can be operated at a time and the sequence is limited by the interlock mechanism. Proceeding from FIG. 6 back to FIG. 5, operation can be accomplished in the reverse sequence.

FIG. 5 further shows the lock bar 55 interposed. It functions in the same manner as it did in the description of FIG. 3. It is particularly desirable that hex stock be used so that the lock bar locks two valves if and only if both have been operated. The lock bar installed in FIG. 5 on valves 61 and 63 is placed on valves 62 and 63 in FIG. 6 after operation. The two angular positions are symmetrical.

Two or three readily implemented alterations can be added to those which have already been described. For instance, the handles 33 can be omitted and set screws can be used in their place. The disks 40 are preferably constructed of fairly thick stock so that they have substantially thick interferring edges. The disk construction of the preferred embodiment contemplates a disk whereby notches are cut to a maximum depth of about one-half to one inch depending on scale. The notches in all the disks are punched or cut on a milling machine to achieve a notched curvature which is an arc of the disk itself. Thus, if the disk blank has a four inch diameter, any notch which is cut in that blank also has a four inch diameter. Notch depth should be limited to about one-third of the disk radius.

Figure 8:
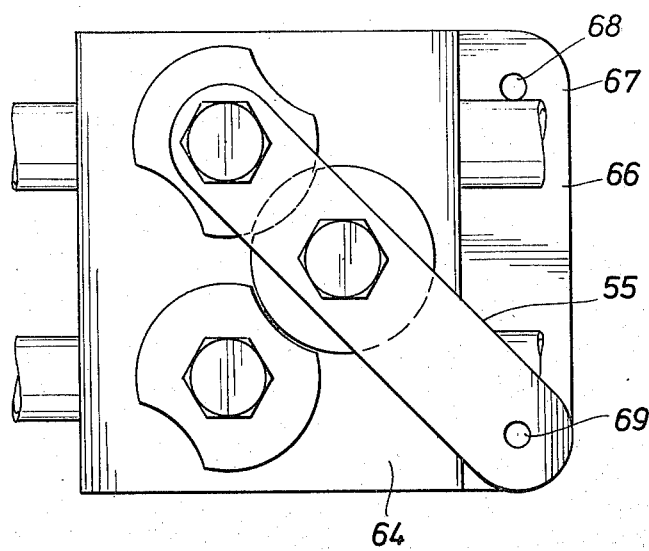
FIG. 8 is a plan view of a lock bar cooperative with a lock to prevent tampering.
Figure 9:
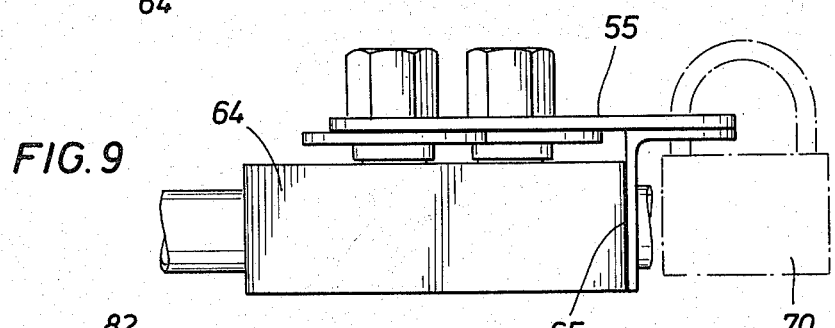
FIG. 9 is a side view of the structure shown in FIG. 8.

Attention is next directed jointly to FIGS. 8 and 9 of the drawings. The lock bar 55 is shown in both views. The two views illustrate a means for attaching the lock bar. Briefly, a valve manifold body 64 is included in the two views, and has a side face 65. The side face 65 is suitable for attaching a short piece of angle stock. The angle stock 66 is cut to match the width of the valve body 64, and it preferably extends slightly above the top face of the valve body 64. It incorporates a protruding flange portion. The flange portion is shown in FIG. 8 to extend outwardly from the valve body 64, and the corners are rounded at 67 to reduce the number of sharp edges. Moreover, two holes are drilled, the holes being symmetrically located with respect to a centerline through the valve body bisecting the angle member 66. The topmost hole 68 is symmetrically located with respect to a centerline through the apparatus to position a hole in the lock bar aligned with the hole 68. The lock bar is thus provided with a single hole 69. The hole 69 is thus aligned with the upper or lower matching hole in the angle member 66. Alignment with the two holes is determined by the position of the lock bar 55, and that, in turn, is determined by positioning the lock bar on a selected pair of the valve stems. In summation, the lock bar can be positioned at only two positions and in both positions, the lock bar is located above the matching hole 68.

A conventional padlock 70 is installed on the lock bar and through the angle member 66 to fasten the lock bar in location. As will be observed, it can be locked at either position. This secures the lock bar on the valve stems and prevents tampering or unintended operation.

Figure 10:
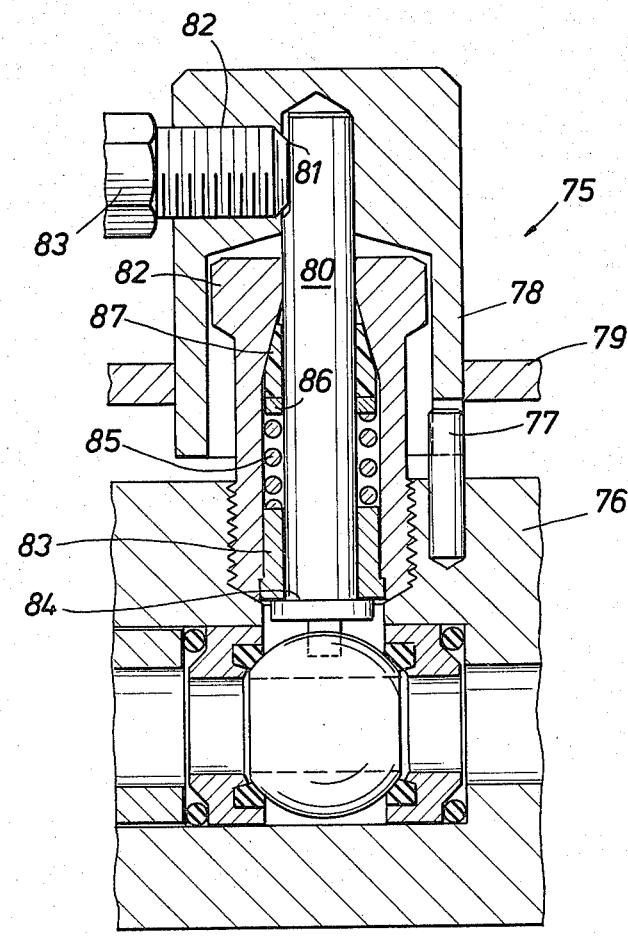
FIG. 10 is a sectional view through an alternate embodiment ball valve, stem and handle supporting an interlock disc.

Attention is next directed to FIG. 10 of the drawings. FIG. 10 depicts an embodiment 75 which is constructed, in part, along the lines disclosed by U.S. Pat. No. 3,457,357. Briefly, this alternate construction of the stem and packing materials protects against leakage. Certain components are best described to show the similarity and differences to the embodiment set forth in FIG. 1. FIG. 10 thus includes a valve body 76 supporting an upstanding solid pin 77 which limits rotation. The pin 77 engages a 90° arcuate notch cut at the bottom periphery of the stem cover. The stem cover is identified by the numeral 78. It is hex-shaped on the exterior identical to that set forth in FIGS. 1 and 2. An alternate arrangement is to make the stem cover round on the exterior as will be described with regard to FIGS. 11-16. In any event, the stem cover supports the interlocking cam disc 70 positioned on the exterior.

FIG. 10 further discloses a centrally located valve stem rod 80. It is cut with a flat at 81, and a tapped hole 82 permits insertion of a handle 83. The handle threads into the tapped hole 82. It bottoms on the flat 81. This locks the stem cover 78 against rotation. The handle 83 can be omitted and replaced by a set screw. In this regard, it is similar in construction to the arrangement shown in FIG. 1.

The stem cover 78 encloses the stem 80. On the interior, it protects by enclosure an axially hollow threaded nut 82. The threaded nut 82 threads to the valve body 76. It is axially hollow, being larger than the stem 80 at most portions of its length, thereby enabling the capture of components on the interior to prevent leakage. As viewed in FIG. 10, leakage on the exterior of the hollow threaded nut 82 is prevented by the mating threads and the shoulder thrust at the end of the nut 82. In fact, the threaded nut 82 is threaded into the body sufficiently deep that it diverts any fluid to the interior. The hollow threaded nut 82 is undercut at its lower end to capture a thimble 83. The thimble 83 is locked between the nut 82 and the body 76 and bears against a shoulder 84 on the stem to prevent blow out. It serves as an alignment means for the valve stem 80 and has an upwardly facing shoulder to receive and support a coil spring 85. The spring 85 is positioned on the exterior of the stem and on the interior of the hollow threaded nut 82. The coil spring 85 rides against a compression ring 86. The ring bears against a fluorocarbon stem seal 87. The seal 87 is made of yieldable material. It is tapered to a wedge (in cross-section) to enable it to nest in the tapered face of the hollow threaded nut 82, and the seal 87 is jammed against the hollow threaded nut 82. The wedging action which occurs jams the seal 87 against the surrounding hollow threaded nut 82 and the stem 80. Consequently, leakage along the stem 80 is prevented. The seal member 87 is reshaped to conform to all surfaces confining it. The spring 85 jams it against these surfaces to assure that a leakproof connection is continued over a long period of time even after substantial wearing has occurred. As wear does occur, the spring 85 elongates, maintaining a fairly constant loading on the seal to maintain fluid integrity.

FIG. 10 depicts valve seal seats and a valve element within the valve body 76 which is similar to that set forth in FIG. 1. It is believed that an added description is not required for an understanding of this portion of the equipment shown in FIG. 10.

Figure 11:
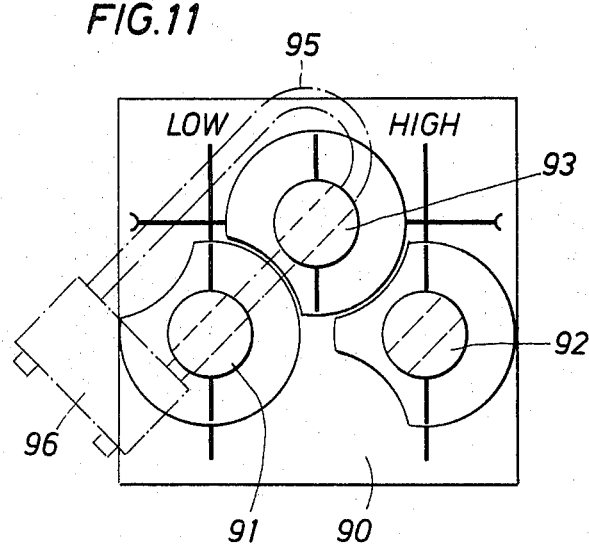
FIGS. 11-16 are similar plan views depicting an alternate form of lock bar to prevent tampering and also showing various operative positions of the handles.

Attention is next directed to FIGS. 11–16 jointly. These are plan views of the valve body showing an alternate form of interlocking. Briefly, the embodiment shown in these views utilize a valve body 90, a first valve 91, a second valve 92, and a third valve 93. The interlocking disks or cams are identical. All the valves are similar in operation. They differ only in construction of the stem cover. The stem cover is preferably round on its exterior. In actuality, it can be any shape, the shape being a matter of indifference inasmuch as the lock bar system utilizes diametrically drilled passages. In FIG. 11, the valve stems are all drilled with holes sized to receive the hasp 95 of a lock 96. So to speak, it is a bicycle lock because it is equipped with a long hasp. The hasp 95 is sufficiently long to pass through two of the valve stems. It is aligned through the valve stems which are drilled with holes at about a 45° angle with respect to the alignment markings which are shown in FIG. 11. It will be appreciated that FIG. 11 depicts embossed alignment markings on the top face of the valve body 90 and also on the interlocking disk as a convenience to the operator. They are symbolic and indicate the position of the respective valves, and the flow paths in which they are interposed. The drilled holes in the valve stems are thus slightly oversized to accommodate the hasp 95. All the holes are drilled at a common elevation and at a common angle. The length of the hasp is selected to enclose two, and the throat is sufficiently wide to enable the hasp to pass through the aligned holes and to encompass two of the valve stems. To this end, the valve stems are not only interlocked to prevent unintended operation, but they are secured by the lock system, namely the lock 96.

Figure 12:
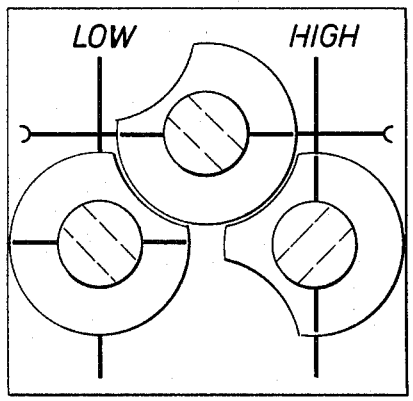
Figure 13:
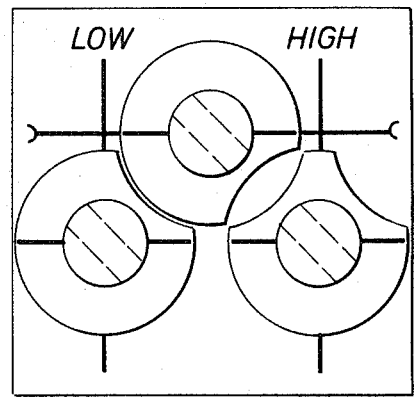

FIGS. 11, 12 and 13 show a similar arrangement. As deployed in the drawings, the pipeline passes below the valve body 90 and two sensor lines located upstream and downstream of an orifice plate are connected to the valve body. The two lines communicate through the valve body 90 in the manner shown by the embossed markings on the face, and connect to the transducer through lines connected from the top edge as shown in FIG. 1. The high pressure is on the right side of FIG. 11 and is low on the left side. Comparing FIGS. 11, 12 and 13, the manifold valving for the test instrument is open for proper operation of the instrument and locked. The lock, of course, is shown by the position of the interlocking disks and is secured by the lock 96. In FIG. 12, the manifold valves have been operated for zeroing the instrument (the high and low lines are interconnected) and locking of the valve stems is not permitted. FIG. 12 shows the arrangement of stems and drilled holes therein which forbids installing the lock 96. This, of course, is a transitory state, not intended to be maintained, except for that time interval during which a service person is attending to the transducer. FIG. 13 shows the transducer shutdown and two of the stems are aligned so that the lock 96 can be reinstalled. The conditions shows in FIGS. 11 and 13 are typically maintained for long periods of time. Instrument service including zeroing to calibrate the instrument is commonly a short term condition.

Figure 14:
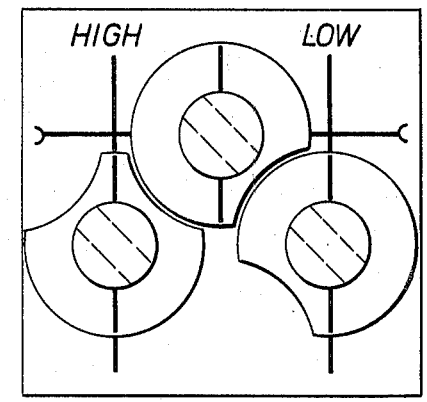
Figure 15:
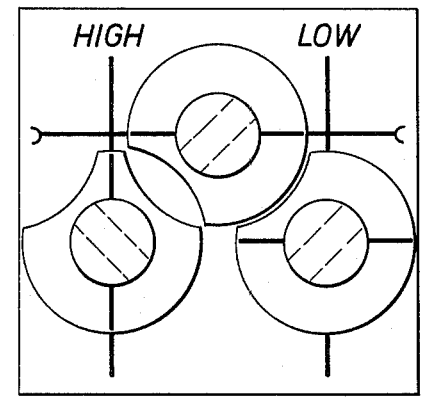
Figure 16:
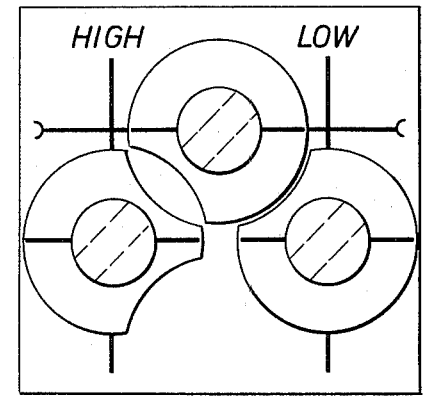

FIGS. 14, 15 and 16 are identical to FIGS. 11, 12 and 13 except that the high and low sides have been swapped. Pipeline flow may be relatively in the opposite direction whereby the low and high side connections are swapped. This marking on the valve body 90 is included to show the contrast between the two arrangements. In other regards, the connection of the transducer via the multivalve manifold with the interlock system of this invention remains the same. If this were not permitted, it would require the installation of the multivalve manifold body 90 inverted. This is highly undesirable. Rather, the face should face upwardly so it can be observed and the valve stems operated by service personnel looking down on the exposed face.

In summary, the lock bar set forth in FIGS. 11–16 also utilizes a padlock, but the bar and padlock have been combined into the form of a lock having a long hasp. Moreover, the valve stems have been modified to include aligned, drilled holes preferably having a common diameter and at a common elevation. The profile of the valve stem then becomes far less important than the embodiment shown in FIG. 1. Moreover, the cam interlock system is the same and operates in the same manner.

While the foregoing is directed to the preferred embodiment of the present invention, other and further embodiments of the invention may be devised without departing from the basic concept thereof, and the scope thereof is determined by the claims which follow.

I claim:

1. A multivalve manifold for interconnecting a pair of fluid signals to a sensor comprising:
 (a) a solid, rectangular valve body means having
  (1) a pair of adjacent inlet ports on one said of said body means;
  (2) a pair of adjacent outlet ports on an opposing side of said body means; and
  (3) a pair of interconnecting passages in said body means extending between said inlet and outlet ports;
 (b) first and second valves in said body means opening and closing fluid flow through said passages;
 (c) third valve in said body means opening and closing a passage between said interconnected passages downstream from said first and second valves;
 (d) first, second and third valve stems connected to said first, second and third valves, respectively, and extending from said body means parallel to the other of said valve stems, each of said valve stem being enclosed by a valve stem cover dependent on rotation of said valve stems to a specified angular position;
 (e) interlock means connected to said valve stems cooperatively
  (1) preventing two of said valve stems from rotating while permitting one of the three valve stems to rotate;
  (2) permitting only one of said two valve stems to rotate after said one of said valve stems has rotated;
  (3) permitting the last of said valve stems to rotate after rotation of two of said valve stems;
  (4) wherein rotation is between full open and closed valve positions; and
 (f) lock bar means being mounted about said valve stem covers for securing at least two of said valve stems against operation, said lock bar means being selectively removeable to enable operation of said valve stems.

2. The apparatus of claim 1 wherein said valve stems are arranged in an isosceles triangle.

3. The apparatus of claim 1 wherein said valve stems and covers each include:
 (a) an upstanding shaft;
 (b) a handle joined to said shaft;
 (c) an encircling and shielding stem cover made of non-round stock; and (d) pin and shoulder means cooperative with said valve stems and valve body means for limiting angular rotation of said valve stems to 90°.

4. The apparatus of claim 3 including lock bar means having two nonround holes therein located and keyed to encircle two nonround stem covers dependent on rotation of said valve stems to a specified angular position.

5. The apparatus of claim 4 wherein said lock bar means includes two holes in a bar having two face portions enabling one face to be exposed by said bar on installation on two of said valve stems, and a second face alternatively exposed on installation.

6. A protected, selectively operable multivalve manifold comprising:
(a) a valve body having at least a pair of valve stems protruding perpendicular above a face thereof, each of said valve stems being enclosed by a valve stem cover dependent on rotation of said valve stems to a specified angular position;
(b) interlock means connected to said valve stems for permitting a selected one of said valve stems to be operated, and only after operation of said selected one stem, permitting operation of said selected one stem, permitting operation of a second valve stem; and
(c) lock bar means being mounted about said valve stem covers for securing said valve stems against operation, said lock bar means being selectively removable to enable operation of two of said valve stems.

7. The apparatus of claim 6 wherein said lock bar means comprises an elongate flat bar having a pair of keyed and spaced openings therein located to lock to a pair of valve stems only on rotation of said stems to a specified operative position, and said stems including a cooperative keyed construction and arrangement.

8. The apparatus of claim 7 wherein said lock bar means comprises an elongate hasp and lock, and said stems include lock hasp engaging means aligning on rotation to a specified operative position.

9. The apparatus of claim 6 wherein a third parallel valve stem and said lock bar means selectively locks a pair of said valve stems against rotation on reinstallation on said valve stems.

10. The apparatus of claim 6 wherein said valve stems are formed of upstanding rotatable members and each has hole means formed therein and positioned at a common height above said valve body, and said hole means are aligned in azimuth on positioning said valve stems at a selected and permitted stem position, and said hole means do not align at an alternate stem position.

11. The apparatus of claim 6 wherein said stems are hex shaped in section, and said lock bar means has a pair of hex holes therein spaced to permit said lock bar means to pass over and around said stems.

12. A protected, selectively operable multivalve manifold comprising:
(a) a valve body having at least a pair of valve stems protruding perpendicular above a face thereof;
(b) interlock means connected to said valve stems for permitting a selected one of said valve stems to be operated, and only after operation of said selected one stem, permitting operation of said selected one stem, permitting operation of a second valve stem;
(c) lock bar means securing said valve stems against operation, said lock bar means being selectively removable to enable operation of two of said valve stems; and
(d) wherein said lock bar means comprises an elongate flat bar having a pair of keyed and spaced openings therein located to lock to a pair of valve stems only on rotation of said stems to a specified operative position, and said stems including a cooperative keyed construction and arrangement.

13. The apparatus of claim 12 wherein a third parallel valve stem and said lock bar means selectively locks a pair of said valve stems against rotation on reinstallation on said valve stems.

14. A protected, selectively operable multivalve manifold comprising:
(a) a valve body having at least a pair of valve stems protruding perpendicular above a face thereof;
(b) interlock means connected to said valve stems for permitting a selected one of said valve stems to be operated, and only after operation of said selected one stem, permitting operation of said selected one stem, permitting operation of a second valve stem;
(c) lock bar means securing said valve stems against operation, said lock bar means being selectively removable to enable operation of two of said valve stems; and
(d) wherein said lock bar means comprises an elongate hasp and lock, and said stems include lock hasp engaging means aligning on rotation to a specified operative position.

15. A protected, selectively operable multivalve manifold comprising:
(a) a valve body having at least a pair of valve stems protruding perpendicular above a face thereof;
(b) interlock means connected to said valve stems for permitting a selected one of said valve stems to be operated, and only after operation of said selected one stem, permitting operation of said selected one stem, permitting operation of a second valve stem;
(c) lock bar means securing said valve stems against operation, said lock bar means being selectively removable to enable operation of two of said valve stems; and
(d) wherein said valve stems are formed of upstanding rotatable members and each has hole means formed therein and positioned at a common height above said valve body, and said hole means are aligned in azimuth on positioning said valve stems at a selected and permitted stem position, and said hole means do not align at an alternate stem position.

16. A protected, selectively operable multivalve manifold comprising:
(a) a valve body having at least a pair of valve stems protruding perpendicular above a face thereof;
(b) interlock means connected to said valve stems for permitting a selected one of said valve stems to be operated, and only after operation of said selected one stem, permitting operation of said selected one stem, permitting operation of a second valve stem;
(c) lock bar means securing said valve stems against operation, said lock bar means being selectively removable to enable operation of two of said valve stems; and
(d) wherein said stems are hex shaped in section, and said lock bar means has a pair of hex holes therein spaced to permit said lock bar means to pass over and around said stems.

* * * * *